(12) United States Patent
Hino

(10) Patent No.: US 6,698,931 B2
(45) Date of Patent: Mar. 2, 2004

(54) DYNAMIC PRESSURE-TYPE LIQUID BEARING UNIT

(75) Inventor: Toshifumi Hino, Ozu (JP)

(73) Assignee: Matsushita Electric Industrial Co., Ltd. (JP)

( * ) Notice: Subject to any disclaimer, the term of this patent is extended or adjusted under 35 U.S.C. 154(b) by 104 days.

(21) Appl. No.: 09/959,350

(22) PCT Filed: Feb. 19, 2001

(86) PCT No.: PCT/JP01/01182

§ 371 (c)(1),
(2), (4) Date: Oct. 24, 2001

(87) PCT Pub. No.: WO01/63133

PCT Pub. Date: Aug. 30, 2001

(65) Prior Publication Data

US 2003/0039416 A1 Feb. 27, 2003

(30) Foreign Application Priority Data

Feb. 24, 2000 (JP) ........................................ 2000-046661

(51) Int. Cl.[7] .............................................. F16C 32/06
(52) U.S. Cl. ..................... 384/107; 384/100; 384/15; 384/132
(58) Field of Search ................................ 384/100, 107, 384/111–115, 118–121, 123, 124, 132

(56) References Cited

U.S. PATENT DOCUMENTS

| 5,427,456 A | * | 6/1995 | Hensel ........................ 384/112 |
| 5,806,987 A | | 9/1998 | Nose et al. .................. 384/100 |
| 6,364,532 B1 | * | 4/2002 | Yoshikawa et al. ......... 384/107 |
| 6,524,006 B1 | * | 2/2003 | Lee ............................. 384/107 |

FOREIGN PATENT DOCUMENTS

| JP | 11-153130 | 6/1999 |
| JP | 11-159525 | 6/1999 |

* cited by examiner

*Primary Examiner*—Pam Rodriguez
(74) *Attorney, Agent, or Firm*—Parkhurst & Wendel, L.L.P.

(57) ABSTRACT

The present invention relates to a dynamic pressure-type liquid bearing unit which can prevent lubricating oil from flowing outside by discharging air that is trapped in the bearing. A sleeve and a thrust plate that is attached to one end side of the sleeve sandwich a thrust bearing leaving a gap around the thrust bearing. Unsymmetrical herringbone-shaped dynamic pressure-generating grooves are formed on at least one of the outer circumferential surface of the stationary shaft and the inner circumferential surface of the sleeve. A first capillary sealing portion is formed between one end of the stationary shaft and the sleeve, and a second capillary sealing portion is formed between the other end of the stationary shaft and the thrust plate. Groove portions for removing air are formed between the first capillary sealing portion and the second capillary sealing portion.

4 Claims, 5 Drawing Sheets

DYNAMIC PRESSURE-TYPE LIQUID BEARING UNIT

TECHNICAL FIELD

The present invention relates to a dynamic pressure-type liquid bearing unit.

BACKGROUND ART

Conventionally, a spindle motor using a dynamic pressure-type liquid bearing unit has been used in an information apparatus such as a magnetic disk drive unit, and, for example, in Japanese Unexamined Patent Publication No. H9-210054, a dynamic pressure-type liquid bearing unit which prevents lubricating oil from leaking is disclosed.

FIG. 5 shows a prior-art dynamic pressure-type liquid bearing unit.

A thrust plate 4 is attached to one end side of a sleeve 3 which is rotatably supported on a shaft 2 as a stationary shaft, and a thrust bearing 1 attached to the shaft 2 is sandwiched by the sleeve 3 and the thrust plate 4 with a gap therearound. A sealing plate 5 is fixed-by press-fitting on the other end of the sleeve 3, and a minute space is formed between the inner circumferential surface of the sealing plate 5 and the shaft 2. In addition, a motor hub 6 is adhered by press-fitting on the outer circumferential surface of the sleeve 3.

Lubricating oil is filled in the gap between the shaft 2 and the inner circumferential surface of the sleeve 3 and the gap around the thrust bearing 1 between the sleeve 3 and thrust plate 4 and, and in order to prevent leakage of the lubricating oil, first and second capillary sealing portions 7a and 7b are formed on both end sides of the bearing gap.

Namely, the V-shaped first capillary sealing portion 7a, on which a tapered surface along the axial direction is formed, is formed between the upper end portion of the inner circumferential surface of the sleeve 3 and the shaft 2, and the V-shaped second capillary sealing portion 7b, on which a tapered surface along the axial direction is formed, is formed between the thrust plate 4 and the shaft 2. When the first and second capillary sealing portions 7a and 7b are formed as such, the lubricating oil is retained in the bearing by capillarity, therefore leakage of the lubricating oil can be prevented.

In addition, at least on one surface of the outer circumferential surface of the shaft 2 and the inner circumferential surface of the sleeve 3 that is opposed to the outer circumferential surface, herringbone-shaped dynamic pressure-generating grooves 8a and 8b are formed in the section between the first capillary sealing portion 7a and second capillary sealing portion 7b. Herein, such surface that is formed with the grooves 8a and 8b is the inner circumferential surface of the sleeve. In FIG. 5, the grooves are illustrated with the same height as that of the sleeve 3 and in a laterally shifted manner.

The shape of the dynamic pressure-generating grooves 8a on a radial bearing surface formed on the inner circumferential surface of the sleeve 3 is such that a width A from a central bent portion 10a to an end portion 10b of the dynamic pressure-generating grooves 8a is greater than a width B from the central bent portion 10a to an end portion 10c, and that the shapes of the grooves on either sides of the width A and the width B become unsymmetrical. In addition, the unsymmetrical grooves are formed as dynamic pressure-generating grooves that are located at the furthest position from the thrust bearing 1. With such construction, an oil moving direction, that is produced due to imbalance of dynamic pressure, is restricted to the thrust bearing side and a liquid level position of the lubricating oil is stabilized between 10a and 10b of the dynamic pressure-generating grooves 8a.

Accordingly, in the dynamic pressure-type liquid bearing unit constructed as described above, by rotating a motor, a force is produced to move the lubricating oil toward the center of the bearing, and the height of the liquid level is shifted and the liquid level is stabilized.

However, at the same time as the motor is rotated, the liquid level of the lubricating oil shifts to a position wherein the dynamic pressures inside the dynamic pressure-generating grooves 8a and 8b balance each other, and therefore the dynamic pressure-generating grooves 8a and 8b are partially exposed to air so that the dynamic pressure-generating grooves 8a and 8b easily catch air and the air is trapped in the bearing.

If the trapped air remains in the bearing, there arises a problem that air pressure is generated to push the lubricating oil outside so that the lubricating oil flows out of opening portions.

DISCLOSURE OF THE INVENTION

It is an object of the present invention to solve the above-described problem and provide a dynamic pressure-type liquid bearing unit which can prevent lubricating oil from flowing outside by discharging air that is trapped in the bearing.

A dynamic pressure-type liquid bearing unit of the invention is characterized in that groove portions for removing air are formed on the outer surface of the stationary shaft.

According to the present invention, air that is trapped in the bearing can be discharged at all times and lubricating oil can be prevented from flowing out.

A dynamic pressure-type liquid bearing unit according to a first aspect of the present invention is constructed so that; a thrust plate is attached to one end side of a sleeve which is rotatably supported on a stationary shaft, and a thrust bearing attached to the stationary shaft is sandwiched by the sleeve and the thrust plate leaving a gap around the thrust bearing, unsymmetrical herringbone-shaped dynamic pressure-generating grooves are formed on at least one surface of the outer circumferential surface of the stationary shaft and the inner circumferential surface of the sleeve that is opposed to the outer circumferential surface, and lubricating oil is filled in a gap between the stationary shaft and the inner circumferential surface of the sleeve and the gap around the thrust bearing between the sleeve and the thrust plate, wherein a first capillary sealing portion, on which a tapered surface along the axial direction is formed, is formed between one end of the stationary shaft and the sleeve and a second capillary sealing portion, on which a tapered surface along the axial direction is formed, is formed between the other end of the stationary shaft and the thrust plate, and groove portions for removing air are formed on the outer surface of the stationary shaft between the first capillary sealing portion and the second capillary sealing portion.

According to this construction, even if air is trapped in the lubricating oil, the trapped air is discharged outside by the groove portions for removing air, therefore, expansion due to changes in temperature and air pressure can be suppressed and the lubricating oil is prevented from flowing outside.

A dynamic pressure-type liquid bearing unit according to a second aspect of the present invention is constructed so that; in the first aspect, the groove portions are formed on the side of the second capillary sealing portion.

A dynamic pressure-type liquid bearing unit according to a third aspect of the present invention is constructed so that; in the second aspect, the groove portions are formed to extend to the second capillary sealing portion.

According to this construction, air trapped in the lubricating oil can be discharged outside more easily.

A dynamic pressure-type liquid bearing unit according to a third aspect of the present invention is constructed so that; in any of the first through third aspects, the length of the second capillary sealing portion is made longer than the length of the first capillary sealing portion.

According to this construction, the retention volumes of the lubricating oil in the capillary sealing portions are increased, whereby the lubricating oil can be prevented from leaking outside.

BEST MODE FOR CARRYING OUT THE INVENTION

Hereinafter, embodiments of the present invention will be explained in detail with reference to FIG. 1 through FIG. 4. Components that act in a similar manner as those of FIG. 5 showing a prior art will be described using the same reference symbols.

Embodiment 1

Figure 1:
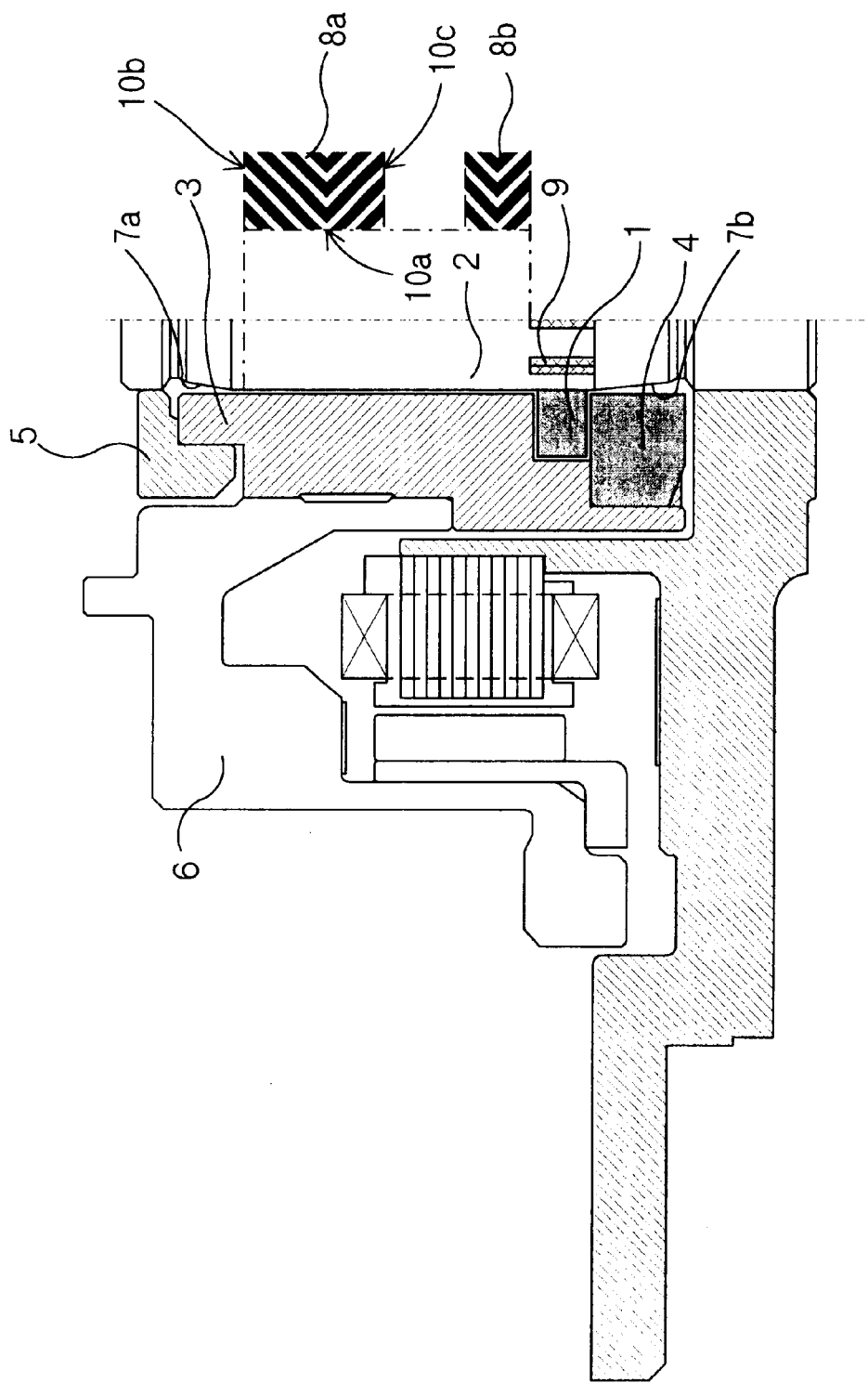
FIG. 1 shows a section of a spindle motor using a dynamic pressure-type liquid bearing unit according to Embodiment 1 of the present invention.
Figure 2:
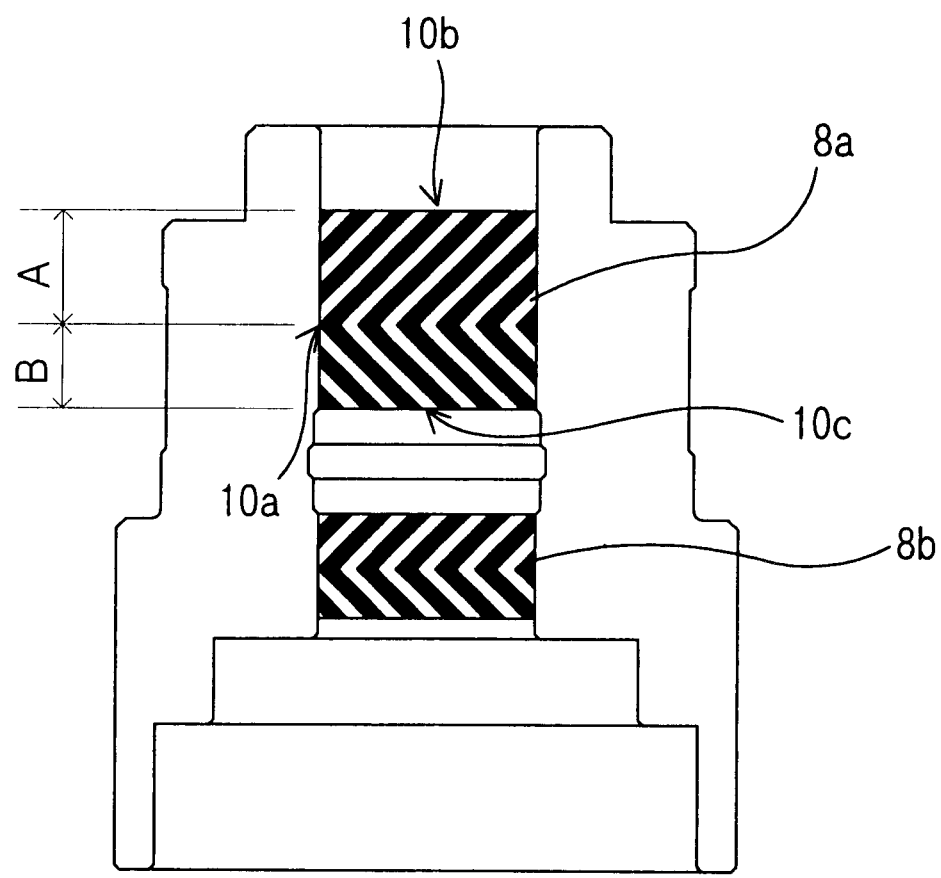
FIG. 2 shows an explanatory view of dynamic pressure generating grooves formed on a shaft of the dynamic pressure-type liquid bearing unit of FIG. 1.

FIG. 1 and FIG. 2 show Embodiment 1.

Figure 5:
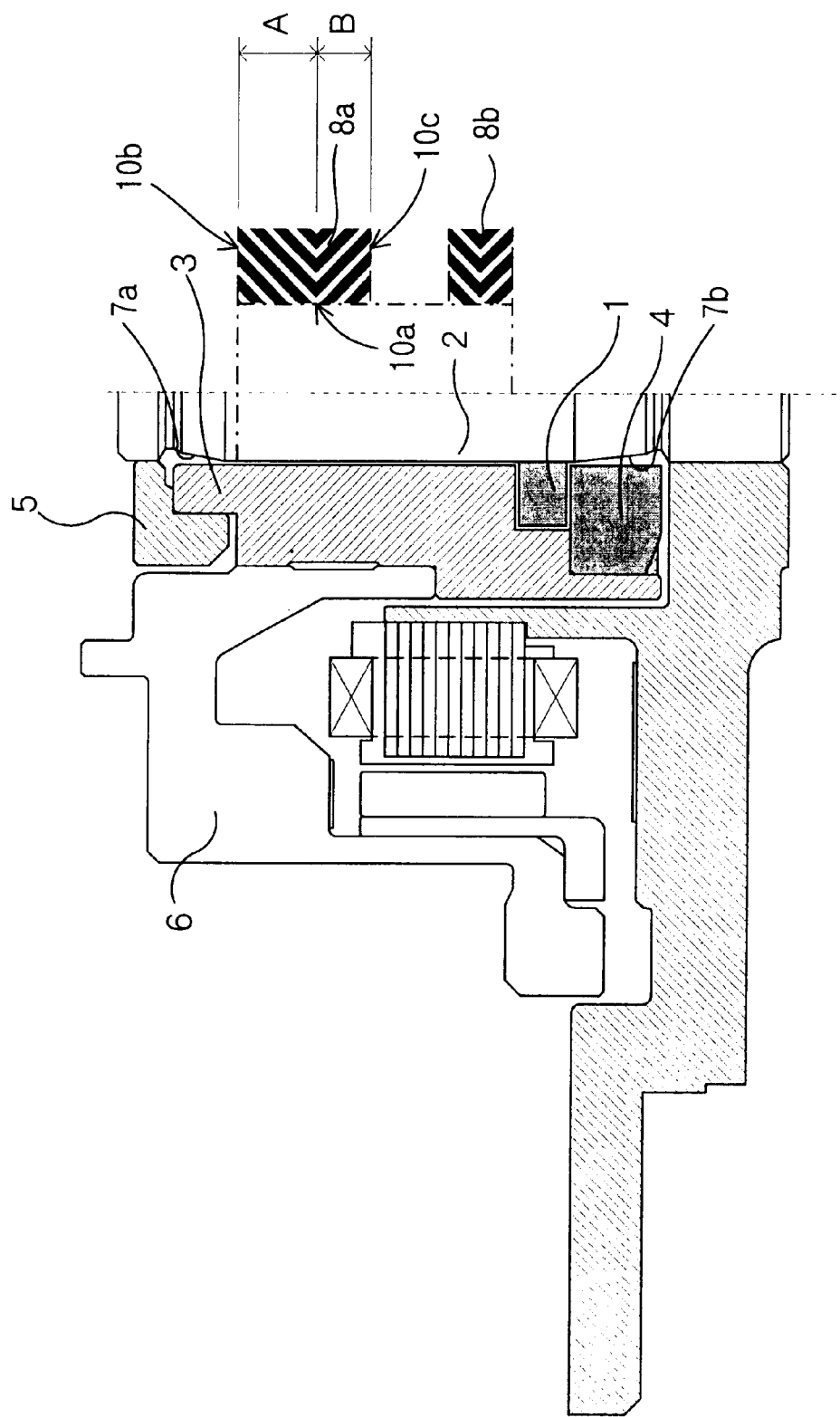
FIG. 5 shows a section of a spindle motor using a dynamic pressure-type liquid bearing unit of a prior art.

Embodiment 1 is generally similar in construction to FIG. 5 showing the prior art, however, differs from the latter in that that groove portions 9 for removing air are formed on the outer circumferential portion of a shaft 2 so as to prevent lubricating oil from leaking.

As shown in FIG. 1, in a dynamic pressure-type liquid bearing unit, a thrust plate 4 is attached to one end side of a sleeve 3 made of brass or the like, which is rotatably supported on the shaft 2 as a stationary shaft, and a thrust bearing 1 attached to the shaft 2 is sandwiched by the sleeve 3 and the thrust plate 4 leaving a gap around the thrust bearing. On the other end of the sleeve 3, a sealing plate 5 is fixed by press-fitting on the shaft 2, and a minute space is formed between the inner circumferential surface of the sealing plate 5 and the shaft 2.

The shaft 2 on which the thrust bearing 1 is fixed is inserted into the sleeve 3. In addition, a motor hub 6 is adhered by press-fitting on the outer circumferential surface of the sleeve 3.

Herringbone-shaped dynamic pressure-generating grooves 8a and 8b are formed on the inner circumferential surface of the sleeve 3.

Dynamic pressure-generating grooves 8a that are formed on the upper side are, as shown in FIG. 2, unsymmetrical in shape in which a width A from a central bent portion 10a to an end portion 10b of the dynamic pressure-generating grooves 8a is greater than a width B from the central bent portion 10a to an end portion 10c. Being thus constructed, lubricating oil produces a force to move itself from the upper end portion of the bearing toward the thrust bearing side, so that an oil moving direction produced due to imbalance of dynamic pressure is restricted and a liquid level height of the lubricating oil is stabilized at a position where dynamic pressure balances between 10a and 10b.

In addition, the lubricating oil is filled in a gap between the shaft 2 and the inner circumferential surface of the sleeve 3 and the gap around the thrust bearing (1) formed by being sandwiched by the sleeve 3 and the thrust plate 4.

In addition, a V-shaped first capillary sealing portion 7a, on which a tapered surface along the axial direction is formed, is formed between the upper end portion of the inner circumferential surface of the sleeve 3 and the shaft 2, and a V-shaped second capillary sealing portion 7b, on which a tapered surface along the axial direction is formed, is formed between the thrust plate 4 and the shaft 2. By providing these first and second capillary sealing portions 7a and 7b, a phenomenon that the liquid lubricating oil shifts from a wider section toward a narrower section, that is to say capillarity, occurs, so that the lubricating oil can be retained in the bearing portion and prevented from leaking outside.

In addition, a plurality of groove portions 9 for removing air are formed on the outer surface of the shaft 2 between the first capillary sealing portion 7a and the second capillary sealing portion 7b.

Being thus constructed, as a motor is rotated, a force is produced to act so that the lubricating oil is moved toward the direction of the lower thrust bearing 1, the height of the liquid surface is shifted, and the liquid surface is stabilized. At this time, since the height of the liquid surface shifts to a position where the dynamic pressures balance between 10a and 10b of the dynamic pressure-generating grooves 8a, the dynamic pressure-generating grooves 8a are partially exposed to air and air is trapped in the bearing.

However, in Embodiment 1, since a plurality of groove portions 9 for removing air are formed on the outer circumferential surface of the shaft 2, the trapped air passes through the groove portions 9 for removing air and is discharged outside via the second capillary sealing portion 7b at all times.

Accordingly, an outflow of the lubricating oil to the outside due to trapping of air in the lubricating oil can be prevented.

Herein, the number of the groove portions 9 for removing air is not particularly limited. It may be a single groove portion or a plurality of groove portions. Also, the shape thereof is not particularly limited.

Embodiment 2

Figure 3:
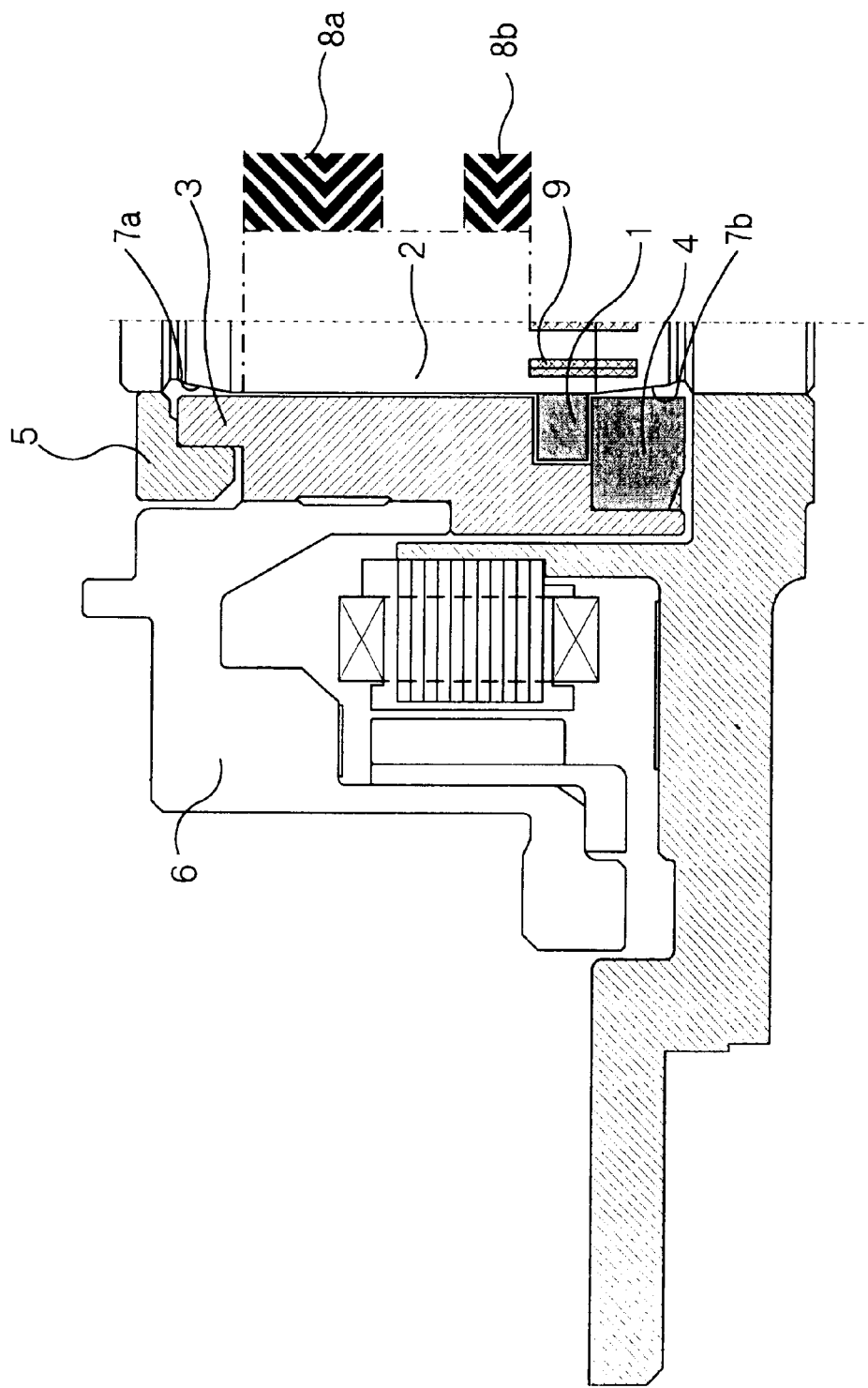
FIG. 3 shows a section of a spindle motor using a dynamic pressure-type liquid bearing unit according to Embodiment 2 of the present invention.

FIG. 3 shows Embodiment 2 of the present invention.

Embodiment 2 is generally similar in construction to the Embodiment 1 described above, however, differs from the latter in that the groove portions 9 for removing air are formed to extend to the second capillary sealing portion 7b.

By extending the groove portions 9 for removing air to the side of the second capillary sealing portion 7b, air that is trapped in the bearing can be discharged outside more smoothly.

Embodiment 3

Figure 4:
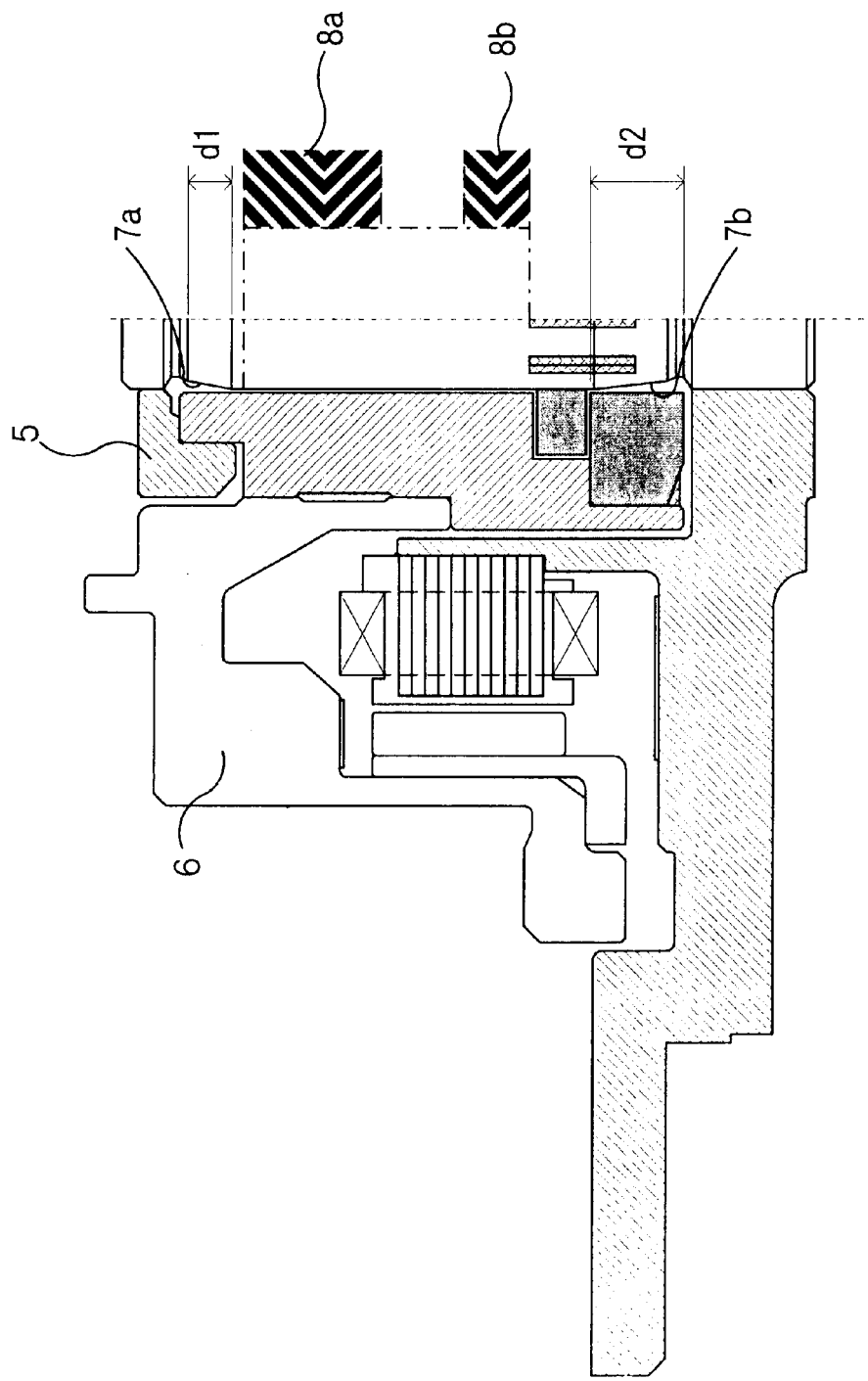
FIG. 4 shows a section of a spindle motor using a dynamic pressure-type liquid bearing unit according to Embodiment 3 of the present invention.

FIG. 4 shows Embodiment 3 of the present invention.

In the above-described embodiments, it is preferable that the length of the second capillary sealing portion 7b is made greater than the length of the first capillary sealing portion 7a.

Namely, in the dynamic pressure-type liquid bearing unit, by rotating a motor, the lubricating oil is shifted in the direction of the thrust bearing by using the unsymmetrical herringbone-shaped grooves 8a formed on a radial bearing, and stabilized, while the shifted lubricating oil is retained in the second capillary sealing portion 7b.

In addition, since the air trapped in the lubricating oil is also discharged outside from the second capillary sealing portion 7b, by setting the length d2 of the second capillary sealing portion 7b, preferably, to be 1.5 to 3 times as great as the length d1 of the first capillary sealing portion 7a, the retention volume of the lubricating oil in the second capillary sealing portion 7b can be increased and the lubricating oil can be prevented from leaking outside more effectively.

In each of the above-described embodiments, the dynamic pressure-generating grooves 8a and 8b are formed on the side of the inner circumferential surface of the sleeve 3. However, the present invention is not limited hereto and in a case where the dynamic pressure-generating grooves are formed on the side of the shaft 2 or on both the shaft 2 and the sleeve 3, similar effects can also be obtained.

In addition, in the above-described embodiments, the dimensional difference of the unsymmetrical grooves is set as 0.2 mm, the distance between the sleeve 3 and the shaft 2 is set as 3 μm, and eight grooves 9 for removing air are formed to have a depth of 0.3 mm and a width of 0.3 mm.

As may be understood through the above embodiments, according to the dynamic pressure-type liquid bearing of the present invention, the first capillary sealing portion is formed between one end of the stationary shaft and the sleeve, the second capillary sealing portion is formed between the other end of the stationary shaft and the thrust plate, and the groove portions for removing air are formed on the outer surface of the stationary shaft between the first capillary sealing portion and the second capillary sealing portion. As a result, air trapped in the bearing is discharged at all times and the lubricating oil can be prevented from flowing outside.

In addition, by setting the capillary sealing portion on the air-discharging side to be long, the lubricating oil can be prevented from flowing outside.

What is claimed is:

1. A dynamic pressure-type liquid bearing unit, comprising:

a thrust plate, a sleeve, a stationary shaft having an axial direction and a thrust bearing, wherein:

the thrust plate is attached to one end side of the sleeve, the sleeve is rotatably supported on the stationary shaft, and the thrust bearing is attached to the stationary shaft and is located between the sleeve and the thrust plate leaving a gap around the thrust bearing, unsymmetrical herringbone-shaped dynamic pressure-generating grooves located on at least one part of the outer circumferential surface of the stationary shaft and on the inner circumferential surface of the sleeve that is opposed to the outer circumferential surface of the stationary shaft, lubricating oil located in a gap between the stationary shaft and the inner circumferential surface of the sleeve and in the gap around the thrust bearing, a first capillary sealing portion of the stationary shaft having a tapered surface along the axial direction is located between one end of the stationary shaft and the sleeve, and a second capillary sealing portion having a tapered surface along the axial direction of the stationary shaft is located between the other end of the stationary shaft and the thrust plate, and groove portions comprising indentations having a bottom surface at a predetermined depth for removing air are located on the outer surface of the stationary shaft between the first capillary sealing portion and the second capillary sealing portion, for ducting air for discharge via the second capillary sealing portion.

2. The dynamic pressure-type liquid bearing unit as set forth in claim 1, wherein the groove portions are located on a side of the second capillary sealing portion.

3. The dynamic pressure-type liquid bearing unit as set forth in claim 2, wherein the groove portions extend to the second capillary sealing portion.

4. The dynamic pressure-type liquid bearing unit as set forth in claim 1, wherein the length of the second capillary sealing portion is greater than the length of the first capillary sealing portion.

\* \* \* \* \*